US011247598B2

(12) United States Patent
Shitara et al.

(10) Patent No.: US 11,247,598 B2
(45) Date of Patent: Feb. 15, 2022

(54) VEHICLE CABIN STRUCTURE

(71) Applicant: Toyota Jidosha Kabushiki Kaisha, Toyota (JP)

(72) Inventors: Masaki Shitara, Nagakute (JP); Yuchi Yamanouchi, Toyota (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/909,488

(22) Filed: Jun. 23, 2020

(65) Prior Publication Data

US 2020/0406800 A1 Dec. 31, 2020

(30) Foreign Application Priority Data

Jun. 28, 2019 (JP) .............................. JP2019-121329

(51) Int. Cl.
*B60N 3/02* (2006.01)
*B62D 31/02* (2006.01)

(52) U.S. Cl.
CPC ............. *B60N 3/026* (2013.01); *B62D 31/02* (2013.01)

(58) Field of Classification Search
CPC .......... B60N 3/02; B60N 3/026; B62D 31/02
USPC ...................................................... 296/1.02
See application file for complete search history.

(56) References Cited

U.S. PATENT DOCUMENTS

| 497,893 | A | * | 5/1893 | Rombauer | B60N 3/02 |
| | | | | | 105/354 |
| 1,311,075 | A | * | 7/1919 | Johnson | B60N 3/02 |
| | | | | | 105/354 |
| 3,667,807 | A | * | 6/1972 | Beeson | B60R 22/02 |
| | | | | | 280/808 |
| 5,649,735 | A | * | 7/1997 | Tomforde | B60N 3/02 |
| | | | | | 105/354 |
| 2013/0341947 | A1 | * | 12/2013 | Huelke | B60N 3/026 |
| | | | | | 296/1.02 |
| 2020/0406802 | A1 | * | 12/2020 | Shitara | B62D 31/00 |
| 2021/0009021 | A1 | * | 1/2021 | Nakai | B60N 2/242 |

FOREIGN PATENT DOCUMENTS

| DE | 10321662 A1 * | 12/2004 | ......... B60R 13/0212 |
| DE | 102014226629 A1 * | 6/2016 | ............... B60N 3/02 |
| DE | 102016217740 B3 * | 11/2017 | .............. B61D 49/00 |
| EP | 2199175 A1 * | 6/2010 | ......... B60R 13/0206 |
| FR | 1026310 A * | 4/1953 | ............... B60R 7/10 |
| FR | 3043606 A1 * | 5/2017 | ............... B60N 3/02 |
| JP | 05131926 A * | 5/1993 | ............... B60N 3/02 |

(Continued)

OTHER PUBLICATIONS

JPH 926 machine translation (Year: 1993).*

*Primary Examiner* — Hilary L Gutman
(74) *Attorney, Agent, or Firm* — Dinsmore & Shohl LLP

(57) ABSTRACT

A vehicle cabin structure includes a vehicle cabin and a handrail having an inverted U-shape and including an upper portion extending in a width direction of a vehicle along a ceiling surface of the vehicle cabin, and right and left vertical portions connected to both ends of the upper portion and extending downward along right and left side surfaces of the vehicle cabin from the respective ends of the upper portion, in which the right and left vertical portions of the handrail are fixed to the right and left side surfaces of the vehicle cabin, respectively.

18 Claims, 4 Drawing Sheets

(56) References Cited

FOREIGN PATENT DOCUMENTS

| JP | 05131927 A | * | 5/1993 | ............... B60N 3/02 |
| JP | H8282353 A | | 10/1996 | |
| JP | 2000043720 A | * | 2/2000 | ............... B60N 3/02 |
| JP | 2002104239 A | * | 4/2002 | ............ B60J 5/0477 |
| JP | 2006035969 A | * | 2/2006 | ............... B60N 3/02 |

* cited by examiner

VEHICLE CABIN STRUCTURE

CROSS REFERENCE TO RELATED APPLICATION

This application claims priority to Japanese Patent Application No. 2019-121329 filed on Jun. 28, 2019, which is incorporated herein by reference in its entirety including the specification, claims, drawings, and abstract.

TECHNICAL FIELD

The present disclosure relates to a vehicle cabin structure, and particularly to the structure of a handrail installed in the vehicle cabin.

BACKGROUND

In a share-ride vehicle, such as a bus, handrails are installed to assist passengers to stand in the vehicle cabin or get in and out of the vehicle by holding the handrails. Such handrails are often attached to interior members of the vehicle cabin (e.g., see JP 8-282353 A).

SUMMARY

The handrail sometimes receive a large load at a fixed portion thereof when the passenger holds on to the handrail to keep his/her posture. In the structure disclosed in JP 8-282353 A in which the handrail is attached to the interior member of the vehicle cabin, the handrail may have an insufficient fixing strength.

Therefore, it is an object of the present disclosure to increase a fixing strength of a handrail installed in a vehicle cabin.

A vehicle cabin structure according to the present disclosure includes a vehicle cabin and a handrail having an inverted U-shape and including an upper portion extending in a width direction of a vehicle along a ceiling surface of the vehicle cabin, and right and left vertical portions connected to respective ends of the upper portion and extending downward along right and left side surfaces of the vehicle cabin from respective ends of the upper portion, in which the right and left vertical portions of the handrail are fixed to the right and left side surfaces, respectively, of the vehicle.

The handrail is formed in the inverted U-shape by the upper portion and the right and left vertical portions, and the right and left vertical portions are fixed on the side surfaces of the vehicle cabin. Thus, the fixing strength of the handrail increases. Even when the ceiling portion of the vehicle cabin has a low strength, the upper portion of the handrail can be disposed along the ceiling surface.

The vehicle cabin structure of the present disclosure may include handrails disposed in front and rear portions of the vehicle cabin, and upper portions of the handrails disposed in the front and rear portions may be connected together with a connecting member in a front-rear direction of the vehicle.

The reverse U-shaped handrails are disposed in the front and rear portions, and the upper portions of the handrails are connected. This achieves an integrated structure of the two handrails and increases the strength of the entire handrails.

The vehicle cabin structure of the present disclosure may include a strap attached to the connecting member.

Accordingly, a load generated when the passenger holds the strap is transmitted to the right and left vertical portions of each of the front and rear handrails and is received by the two front and rear handrails. Thus, the load from the strap is received in a distributed manner. In addition, the strap can be disposed near the ceiling even when the ceiling portion of the vehicle cabin has a low strength.

The vehicle cabin of the vehicle cabin structure of the present disclosure may include right and left vertical frame members extending vertically along the right and left side surfaces, respectively, of the vehicle cabin to form the skeletal structure of the vehicle cabin, and right and left vertical interior members covering vehicle cabin-side inner surfaces of the right and left vertical frame members, respectively, of the vehicle cabin, in which the right and left vertical portions of the handrail may be fixed to the right and left vertical interior members, respectively.

The handrail is fixed to the vertical interior members covering the vertical frame members, so that the handrail can be fixed firmly even when the vehicle has small side wall surfaces on the right and left sides.

The handrail in the vehicle cabin structure of the present disclosure may include right and left side portions extending in the front-rear direction of the vehicle from lower ends of the right and left vertical portions, respectively, and the right and left side portions may be fixed to the right and left side surfaces, respectively, of the vehicle cabin.

The handrail includes the side portions, and the side portions are fixed to the side surfaces of the vehicle cabin. Thus, the fixing strength of the handrail further increases.

The vehicle cabin of the vehicle cabin structure of the present disclosure may include right and left side frame members extending in the front-rear direction of the vehicle along the right and left side surfaces, respectively, to form the skeletal structure of the vehicle cabin, and right and left side interior members covering the inner surfaces of the right and left side frame members, respectively, of the vehicle cabin, in which the right and left side portions of the handrail may be fixed to the right and left side interior members, respectively.

The handrail is fixed to the side interior members covering the side frame members, so that the handrail can be fixed firmly even when the vehicle has small side wall surfaces on the right and left sides.

The present disclosure achieves an increased fixing strength of the handrail installed in the vehicle cabin.

DESCRIPTION OF EMBODIMENTS

An embodiment of a vehicle cabin structure 30 will be described below with reference to the accompanying drawings. First, an electric bus 100 including the vehicle cabin structure 30 is described with reference to FIG. 1. Note that the arrows FR, UP, and LH that are appropriately illustrated in each of the drawings represent the front (traveling direction) of the vehicle, the top of the vehicle, and the left side of the vehicle, respectively. In contrast, the directions opposite to the arrows FR, UP, and LH represent the rear of the vehicle, the bottom of the vehicle, and the right side of the vehicle, respectively. In the following description, when the directions are simply referred to as front and rear, right and left, and up and down, such directions are intended to represent the front and rear directions, the right and left directions (vehicle width direction), and the up and down directions of the vehicle.

Figure 1:
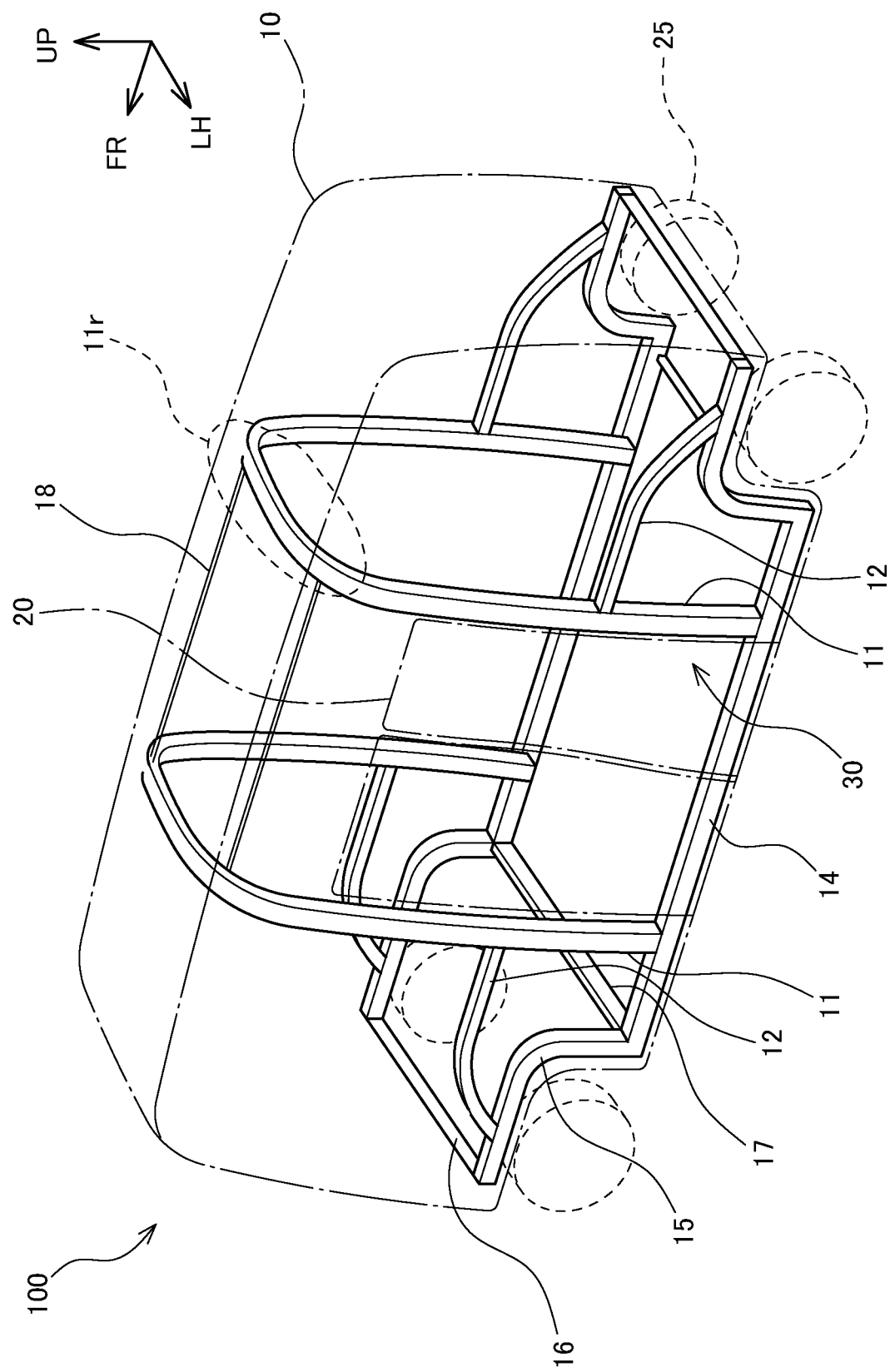
FIG. 1 is a perspective view illustrating a skeletal structure of a vehicle cabin having a vehicle cabin structure according to an embodiment.

As illustrated in FIG. 1, an electric bus 100 includes a vehicle cabin 10, a door 20 disposed on a side surface of the vehicle cabin 10 for boarding, and wheels 25 driven by a motor which is not illustrated. The vehicle cabin 10 has a skeletal structure and is mounted on a ladder frame which is not illustrated.

The skeletal structure of the vehicle cabin 10 includes pillars 11, upper side members 12, floor side members 14, lower side members 15, cross members 16 and 17, and roof members 18. The floor side members 14 extend in a front-rear direction of the vehicle cabin 10 at both sides widthwise in a lower portion of the vehicle cabin 10. The lower side members 15 extend upward from the front or rear ends of the floor side members 14, while extending in the front-rear direction above the wheels 25. The cross member 16 connects the front ends or the rear ends of the lower side members 15 widthwise, and the cross member 17 connects the front ends or the rear ends of the floor side members 14 widthwise.

The pillars 11 are attached to the right and left floor side members 14 and extend vertically in the vehicle. The pillars 11 are disposed in front and rear portions of the vehicle, with the door 20 disposed between the front and rear pillars 11. Upper ends of right and left portions of each pillar 11 are connected in the inverted U-shape to form a roof portion 11r. The upper side members 12 are connected to the pillars 11 and extend frontward and rearward, respectively, in the vehicle, with tip ends thereof connected to the lower side members 15. The roof members 18 connect the roof portions 11r of the pillars 11 in the front-rear direction of the vehicle.

Note that the pillars 11 are vertical frame members extending vertically in the vehicle and forming the skeletal structure of the vehicle cabin 10. The upper side members 12 are side frame members extending in the front-rear direction of the vehicle and forming the skeletal structure of the vehicle cabin 10.

Figure 2:
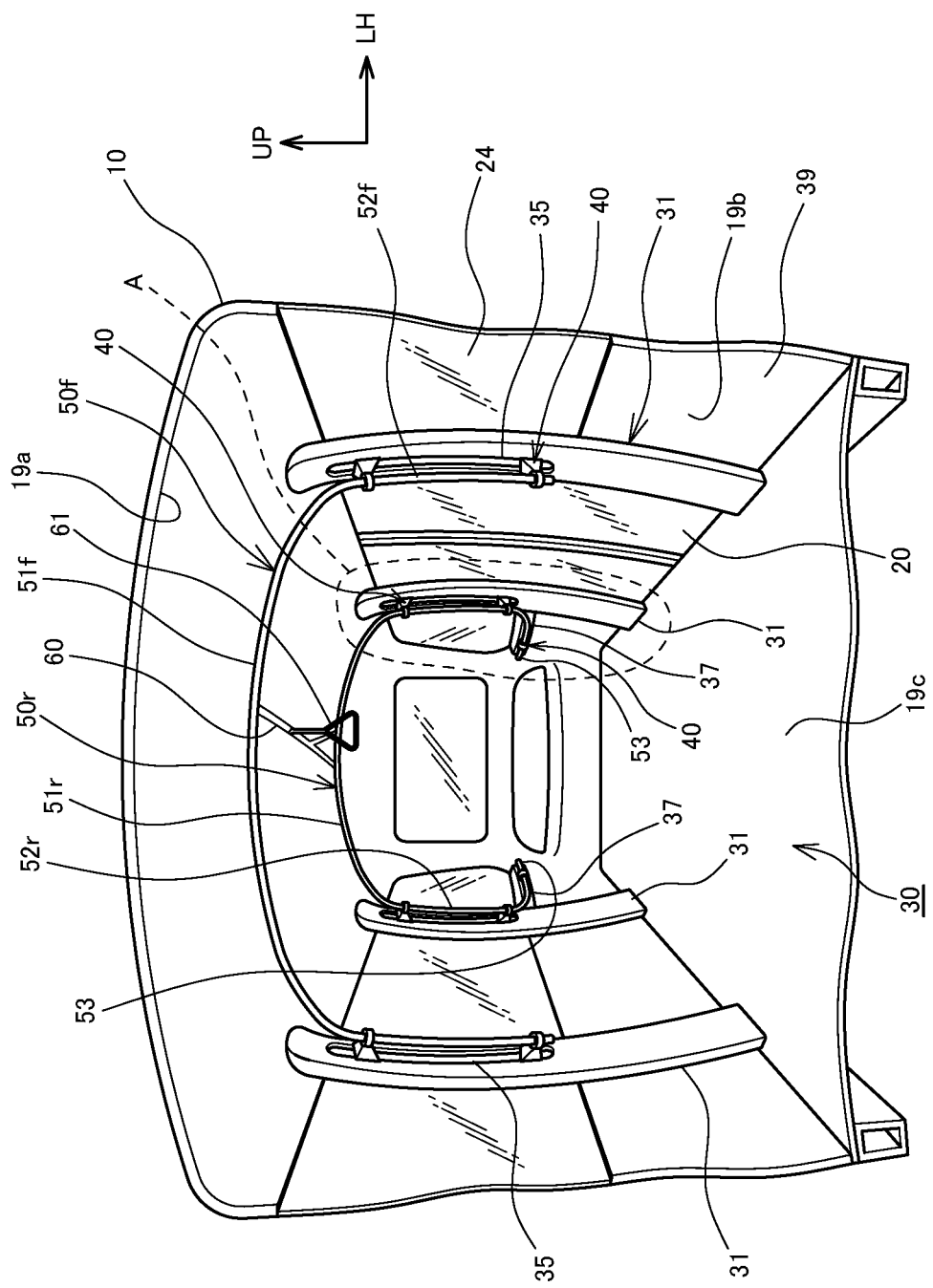
FIG. 2 is a perspective view of the vehicle cabin structure according to the embodiment when seen from the inside of the vehicle cabin.

Next, the vehicle cabin structure 30 is described with reference to FIGS. 2 to 4. The vehicle cabin structure 30 includes a handrail 50f disposed in the front portion of the vehicle, a handrail 50r disposed in the rear portion of the vehicle, a connecting member 60 connecting the front and rear handrails 50f and 50r, and a strap 61 attached to the connecting member 60.

The handrail 50f in the front portion of the vehicle has the inverted U-shape and includes an upper portion 51f extending along a ceiling surface 19a of the vehicle cabin 10 and right and left vertical portions 52f connected to respective ends of the upper portion 51f and extending downward along right and left side surfaces 19b of the vehicle cabin 10 from respective ends of the upper portion 51f. The right and left vertical portions 52f of the handrail 50f are fixed to the right and left side surfaces 19b of the vehicle cabin 10, respectively, with an attachment 40.

Like the handrail 50f in the front portion of the vehicle, the handrail 50r in the rear portion of the vehicle includes an upper portion 51r and right and left vertical portions 52r. The handrail 50r further includes right and left side portions 53 extending rearward in the vehicle from lower ends of the right and left vertical portions 52r, respectively. The right and left vertical portions 52r and the right and left side portions 53 of the handrail 50r are individually connected to the rear portions of the right and left side surfaces 19b of the vehicle cabin 10 with the attachment 40.

The connecting member 60 connects the upper portions 51f and 51r of the front and rear handrails 50f and 50r, respectively. The strap 61 is attached to the connecting member 60.

Next, the attaching structure of the left portion of the handrail 50r is described with reference to FIGS. 3 and 4. FIG. 3 is an enlarged perspective view of portion A of FIG. 2 illustrating the rear portion of the vehicle near the left pillar 11 from the inside of the vehicle cabin. FIG. 4 is a cross-sectional view taken along line B-B of FIG. 3.

Figure 3:
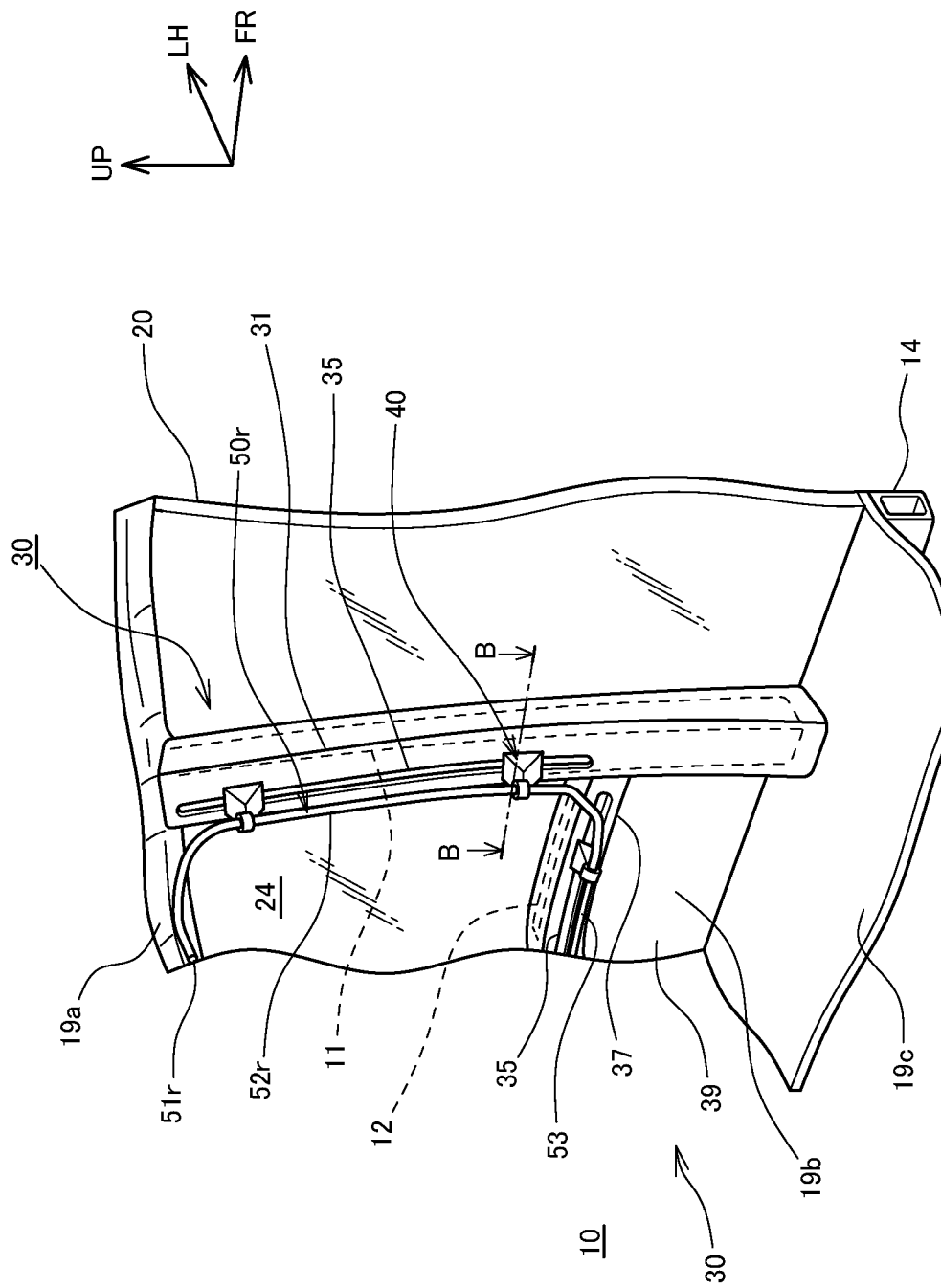
FIG. 3 is an enlarged perspective view of portion A of FIG. 2.
Figure 4:
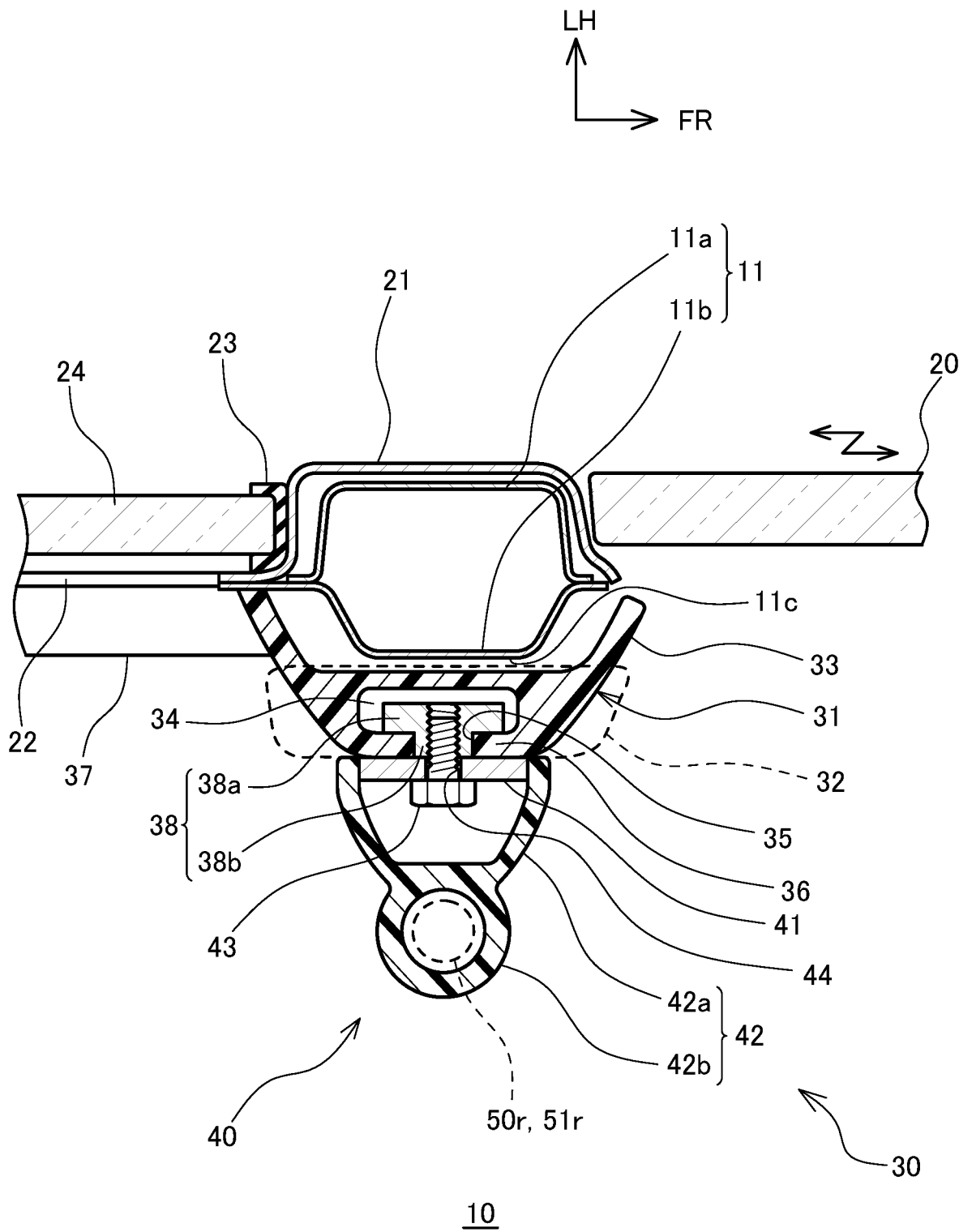
FIG. 4 is a cross-sectional view taken along line B-B of FIG. 3.

As illustrated in FIGS. 3 and 4, the vertical portion 52r of the handrail 50r is fixed, with the attachment 40, to a pillar trim 31 which is a vertical interior member covering a vehicle cabin inner-side surface 11c of the pillar 11. The pillar trim 31 extends between the ceiling surface 19a and a floor surface 19c of the vehicle cabin 10. Meanwhile, the side portion 53 of the handrail 50r is fixed to a side member trim 37 which is a side interior member covering the upper side member 12 with the attachment 40.

As illustrated in FIG. 4, the pillar 11 is a member having a closed cross-section formed by a pillar outer 11a having a hat-shaped cross-section and a pillar inner 11b. An outer panel 21 forming a design surface is attached to the vehicle exterior side of the pillar 11. A window glass 24 is attached to the rear portion of the outer panel 21 of the vehicle via a rubber member 23. In addition, the door 20 that slidably opens and closes in the front-rear direction of the vehicle is installed in front of the pillar 11. Further, an inner panel 22 is connected to the vehicle inner-side of the outer panel 21 of the vehicle cabin.

The pillar trim 31 of the vehicle cabin structure 30 includes a vehicle cabin inner-side portion 32 having a large thickness and a skirt portion 33 extending toward the exterior of the vehicle from the vehicle cabin inner-side portion 32. The vehicle cabin inner-side portion 32 covers the vehicle cabin inner-side surface 11c of the pillar 11, and the skirt portion 33 covers the side surface of the pillar 11. The vehicle cabin inner-side portion 32 includes a groove 34 extending vertically along the pillar 11. The groove 34 has an opening 35 whose opening width is narrower than an inner width of the groove 34. Therefore, a lip portion 36 protruding toward the opening 35 from respective sides of the groove is formed on respective sides of the opening 35 in the width direction. The pillar trim 31 may be attached to the inner panel 22 or the pillar 11.

Like the pillar 11, the upper side member 12 is a member having a closed cross-section. As illustrated in FIG. 3, the side member trim 37 is connected to a side surface of the pillar trim 31 in the rear portion of the vehicle, and extends toward the rear of the vehicle to cover the vehicle cabin-side inner surface of the upper side member 12. The lower side of the side member trim 37 and the vehicle rear-side of the lower portion of the pillar trim 31 are connected to an interior panel 39.

Like the pillar trim 31, the side member trim 37 also includes the groove 34 extending in the front-rear direction of the vehicle along the vehicle cabin-side inner portion of the upper side member 12 having a large thickness. The groove 34 formed in the side member trim 37 also has an opening width narrower than the width of the groove, so that the lip portion 36 is formed on respective sides of the opening 35. The side member trim 37 may be attached to the inner panel 22 or the upper side member 12.

As illustrated in FIG. 4, the attachment 40 is fixed to the pillar trim 31 with a positioning member 38 and a bolt 43.

The positioning member 38 is disposed inside the groove 34 of the pillar trim 31. The positioning member 38 has a width wider than the width of the opening 35 of the groove 34 and includes a base portion 38a disposed inside the groove 34 and a projection 38b fitted into the opening 35. A screw hole is formed in the center of the positioning member 38.

The attachment 40 includes a base 41, and a main body 42 fitted on the base 41. The main body 42 includes a seat 42a fitted on the base 41, and a handrail attaching portion 42b protruding inward from the seat 42a in the vehicle cabin. A through hole 44 through which the bolt 43 functioning as a fastening member penetrates is formed in the center of the base 41.

The attachment 40 is attached in the following procedure. First, the positioning member 38 is disposed inside the groove 34 of the pillar trim 31. Then, the projection 38b of the positioning member 38 is fitted in a position of the opening 35 to fix the position. The bolt 43 is inserted into the through hole 44 of the base 41 of the attachment 40 to position the base 41 of the attachment 40 facing the positioning member 38. Then, the bolt 43 is screwed into the screw hole of the positioning member 38. When fastened, the bolt 43 connects the positioning member 38 and the base 41 through the opening 35. The lip portions 36 formed on respective sides of the opening 35 of the pillar trim 31 are sandwiched between the positioning member 38 and the base 41. Thus, the base 41 is fixed on the pillar trim 31. Likewise, the base 41 is also fixed on the side member trim 37.

A predetermined position of the handrail 50r is passed through the handrail attaching portion 42b of the main body 42. After the base 41 is fixed to the pillar trim 31 and the side member trim 37, the seat 42a of the main body 42 to which the handrail 50r has been attached is fitted in the base 41. Thus, as illustrated in FIG. 3, the handrail 50r is attached to the pillar trim 31 and the side member trim 37.

The attaching structure on the left portion of the handrail 50r has been described above. The same attaching structure applies to the right portion of the handrail 50r.

Like the rear handrail 50r, the front handrail 50f is fixed to the right and left pillar trims 31 covering the pillar 11 in the front portion of the vehicle with the attachment 40.

The above-described vehicle cabin structure 30 includes the front and rear handrails 50f and 50r having the inverted U-shape formed by the upper portions 51f and 51r and the right and left vertical portions 52f and 52r, with the right and left vertical portions 52f and 52r fixed to the side surfaces 19b of the vehicle cabin 10. Thus, the fixing strength of the handrails 50f and 50r increases. Even when the ceiling portion of the vehicle cabin 10 has a low strength, the upper portions 51f and 51r of the handrails 50f and 50r can be disposed along the ceiling surface 19a. Further, the upper portions 51f and 51r of the handrails 50r and 50f are connected with the connecting member 60 to achieve the integrated structure of the front and rear handrails 50f and 50r. This increases the strength of the entire handrails 50f and 50r.

Further, the vehicle cabin structure 30 includes the strap 61 attached to the connecting member 60, so that the load generated when the passenger holds the strap 61 is transmitted to the right and left vertical portions 52f and 52r of the front and rear handrails 50f and 50r, respectively, and received by the entire two handrails 50f and 50r Thus, the load from the strap 61 is received in a distributed manner. In addition, the strap 61 can be disposed near the ceiling 19a even when the ceiling portion of the vehicle cabin 10 has a low strength.

Further, the vertical portions 52f and 52r and the side portions 53 are fixed to the pillar trims 31 and the side member trims 37, so that the handrails 50f and 50r can be fixed firmly even when the vehicle is the electric bus 100 having small right and left side surfaces.

The invention claimed is:

1. A vehicle cabin structure, comprising:
   a vehicle cabin; and
   a handrail having an inverted U-shape and including an upper portion extending in a width direction of a vehicle along a ceiling surface of the vehicle cabin, and right and left vertical portions connected to respective ends of the upper portion and extending downward along right and left side surfaces of the vehicle cabin from the respective ends of the upper portion, wherein the right and left vertical portions of the handrail are fixed to the right and left side surfaces, respectively, of the vehicle cabin,
   wherein the vehicle cabin includes
      right and left vertical frame members extending vertically along the right and left side surfaces, respectively, of the vehicle cabin to form a skeletal structure of the vehicle cabin, and
      right and left vertical interior members covering vehicle cabin-side inner surfaces of the right and left vertical frame members, respectively, and
   wherein the right and left vertical portions of the handrail are fixed to the right and left vertical interior members, respectively.

2. The vehicle cabin structure according to claim 1, wherein
   the handrail is disposed in a front portion and a rear portion of the vehicle cabin, and
   the upper portion of the handrail disposed in the front portion and the upper portion of the handrail disposed in the rear portion are connected together with a connecting member in a front-rear direction of the vehicle.

3. The vehicle cabin structure according to claim 2, wherein a strap is attached to the connecting member.

4. The vehicle cabin structure according to claim 1, wherein
   the handrail includes right and left side portions extending in a front-rear direction of the vehicle from lower ends of the right and left vertical portions, respectively, and
   the right and left side portions are fixed to the right and left side surfaces of the vehicle cabin, respectively.

5. The vehicle cabin structure according to claim 2, wherein
   the handrail includes right and left side portions extending in the front-rear direction of the vehicle from lower ends of the right and left vertical portions, respectively, and
   the right and left side portions are fixed to the right and left side surfaces of the vehicle cabin, respectively.

6. The vehicle cabin structure according to claim 3, wherein
   the handrail includes right and left side portions extending in the front-rear direction of the vehicle from lower ends of the right and left vertical portions, respectively, and
   the right and left side portions are fixed to the right and left side surfaces of the vehicle cabin, respectively.

7. The vehicle cabin structure according to claim 4, wherein the vehicle cabin includes
  right and left side frame members extending in the front-rear direction of the vehicle along the right and left side surfaces, respectively, to form a skeletal structure of the vehicle cabin, and
  right and left side interior members covering vehicle cabin-side inner surfaces of the right and left side frame members, respectively, and
  the right and left side portions of the handrail are fixed to the right and left side interior members, respectively.

8. The vehicle cabin structure according to claim 5, wherein
  the vehicle cabin includes
    right and left side frame members extending in the front-rear direction of the vehicle along the right and left side surfaces, respectively, to form a skeletal structure of the vehicle cabin, and
    right and left side interior members covering vehicle cabin-side inner surfaces of the right and left side frame members, respectively, and
  the right and left side portions of the handrail are fixed to the right and left side interior members, respectively.

9. The vehicle cabin structure according to claim 6, wherein
  the vehicle cabin includes
    right and left side frame members extending in the front-rear direction of the vehicle along the right and left side surfaces, respectively, to form a skeletal structure of the vehicle cabin, and
    right and left side interior members covering vehicle cabin-side inner surfaces of the right and left side frame members, respectively, and
  the right and left side portions of the handrail are fixed to the right and left side interior members, respectively.

10. A vehicle cabin structure, comprising:
  a vehicle cabin; and
  a handrail having an inverted U-shape and including an upper portion extending in a width direction of a vehicle along a ceiling surface of the vehicle cabin, and right and left vertical portions connected to respective ends of the upper portion and extending downward along right and left side surfaces of the vehicle cabin from the respective ends of the upper portion,
  wherein the right and left vertical portions of the handrail are fixed to the right and left side surfaces, respectively, of the vehicle cabin,
  wherein the handrail includes right and left side portions extending in a front-rear direction of the vehicle from lower ends of the right and left vertical portions, respectively, and
  wherein the right and left side portions are fixed to the right and left side surfaces of the vehicle cabin, respectively,
  wherein the vehicle cabin includes
    right and left side frame members extending in the front-rear direction of the vehicle along the right and left side surfaces, respectively, to form a skeletal structure of the vehicle cabin, and
    right and left side interior members covering vehicle cabin-side inner surfaces of the right and left side frame members, respectively, and
  wherein the right and left side portions of the handrail are fixed to the right and left side interior members, respectively.

11. The vehicle cabin structure according to claim 10, wherein
  the handrail is disposed in a front portion and a rear portion of the vehicle cabin, and
  the upper portion of the handrail disposed in the front portion and the upper portion of the handrail disposed in the rear portion are connected together with a connecting member in a front-rear direction of the vehicle.

12. The vehicle cabin structure according to claim 11, wherein a strap is attached to the connecting member.

13. A vehicle cabin structure, comprising:
  a vehicle cabin; and
  a handrail consisting of an inverted U-shape and including an upper portion extending in a width direction of a vehicle along a ceiling surface of the vehicle cabin, and right and left vertical portions connected to respective ends of the upper portion and extending downward along right and left side surfaces of the vehicle cabin from the respective ends of the upper portion, wherein
  the right and left vertical portions of the handrail are fixed to the right and left side surfaces, respectively, of the vehicle cabin.

14. The vehicle cabin structure according to claim 13 further comprising:
  a second handrail, wherein
  the handrail is disposed in a front portion and the second handrail is disposed in a rear portion of the vehicle cabin, and
  the upper portion of the handrail disposed in the front portion and an upper portion of the second handrail disposed in the rear portion are connected together with a connecting member in a front-rear direction of the vehicle.

15. The vehicle cabin structure according to claim 14, wherein a strap is attached to the connecting member.

16. The vehicle cabin structure, according to claim 13, wherein the vehicle cabin includes
  right and left vertical frame members extending vertically along the right and left side surfaces, respectively, of the vehicle cabin to form a skeletal structure of the vehicle cabin, and
  right and left vertical interior members covering vehicle cabin-side inner surfaces of the right and left vertical frame members, respectively, and
  the right and left vertical portions of the handrail are fixed to the right and left vertical interior members, respectively.

17. The vehicle cabin structure according to claim 14, wherein
  the second handrail includes right and left vertical portions connected to respective ends of the upper portion and right and left side portions extending in the front-rear direction of the vehicle from lower ends of the right and left vertical portions, respectively, and
  the right and left side portions are fixed to the right and left side surfaces of the vehicle cabin, respectively.

18. The vehicle cabin structure according to claim 17, wherein the vehicle cabin includes
  right and left side frame members extending in the front-rear direction of the vehicle along the right and left side surfaces, respectively, to form a skeletal structure of the vehicle cabin, and
  right and left side interior members covering vehicle cabin-side inner surfaces of the right and left side frame members, respectively, and the right and left side portions of the second handrail are fixed to the right and left side interior members, respectively.

\* \* \* \* \*